(12) United States Patent
Shirai et al.

(10) Patent No.: US 8,148,862 B2
(45) Date of Patent: Apr. 3, 2012

(54) BEARING DEVICE, SPINDLE MOTOR AND DISK DRIVE APPARATUS

(75) Inventors: Hirokazu Shirai, Kyoto (JP);
Kazuyoshi Saito, Kyoto (JP); Shigeki Nakatani, Kyoto (JP)

(73) Assignee: Nidec Corporation, Kyoto (JP)

( * ) Notice: Subject to any disclaimer, the term of this patent is extended or adjusted under 35 U.S.C. 154(b) by 357 days.

(21) Appl. No.: 12/629,095

(22) Filed: Dec. 2, 2009

(65) Prior Publication Data
US 2010/0148607 A1 Jun. 17, 2010

(30) Foreign Application Priority Data
Dec. 11, 2008 (JP) ................................. 2008-315500

(51) Int. Cl.
*H02K 5/16* (2006.01)
(52) U.S. Cl. ........................................ 310/90; 310/67 R
(58) Field of Classification Search ................ 310/67 R, 310/90
See application file for complete search history.

(56) References Cited

U.S. PATENT DOCUMENTS

| 5,715,116 | A * | 2/1998 | Moritan et al. | 360/99.08 |
| 5,798,589 | A * | 8/1998 | Ohi et al. | 310/90 |
| 5,982,064 | A * | 11/1999 | Umeda et al. | 310/90 |
| 7,276,826 | B2 * | 10/2007 | Nishidate | 310/67 R |
| 2004/0189125 | A1 * | 9/2004 | Doemen | 310/90.5 |
| 2006/0087184 | A1 * | 4/2006 | Kuyama et al. | 310/90 |
| 2007/0075601 | A1 * | 4/2007 | Shiraki | 310/90 |
| 2009/0046960 | A1 * | 2/2009 | Hibi et al. | 384/107 |

FOREIGN PATENT DOCUMENTS

| JP | 10-299763 A | 11/1998 |
| JP | 2002-130257 A | 5/2002 |

* cited by examiner

*Primary Examiner* — Thnah Lam
(74) *Attorney, Agent, or Firm* — Keating & Bennett, LLP (57) ABSTRACT

A bearing device includes a shaft, a sleeve and a thrust plate. The shaft includes a convex portion having a curved surface provided at one end thereof. The sleeve includes an inner circumferential surface opposed to an outer circumferential surface of the shaft. The thrust plate includes a concave portion having a curved surface and arranged to make contact with the convex portion of the shaft. The shaft is supported by the sleeve and the thrust plate such that it may rotate about the central axis with respect to the sleeve and the thrust plate. A curvature radius of the concave portion is greater than a curvature radius of the convex portion but equal to or smaller than about 2.0 times of the curvature radius of the convex portion.

18 Claims, 10 Drawing Sheets

BEARING DEVICE, SPINDLE MOTOR AND DISK DRIVE APPARATUS

BACKGROUND OF THE INVENTION

1. Field of the Invention

The present invention relates to a bearing device, a spindle motor provided with the bearing device, and a disk drive apparatus provided with the spindle motor.

2. Description of the Related Art

A hard disk drive or an optical disk drive is typically equipped with a spindle motor arranged to rotate a disk about a central axis. The spindle motor includes a stator unit fixed to a housing of the device and a rotor unit arranged to hold a disk and rotate together with the disk. In the spindle motor, torque acting about the central axis of the spindle motor is generated by the magnetic flux generated between the stator unit and the rotor unit to thereby rotate the rotor unit with respect to the stator unit.

The stator unit and the rotor unit of the spindle motor are coupled together through a bearing device. A bearing device of the type including a substantially cylindrical sleeve surrounding the outer circumferential surface of a shaft and a substantially disk-shaped thrust plate making contact with the lower end portion of the shaft is one example of a conventionally known bearing device. In a bearing device of this type, the shaft is rotated about its central axis within the sleeve while being axially supported with the lower end portion thereof remaining in contact with the upper surface of the thrust plate.

The bearing device of this type enjoys an advantage in that it has a reduced number of component parts and is cost-effective. However, in this bearing device, friction occurs between the lower end portion of the shaft and the upper surface of the thrust plate during rotation of the shaft. This poses a problem in that a loss of torque is caused by the friction. There is also a fear that the thrust plate may be deformed when a load acting toward the thrust plate is applied to the shaft.

In particular, spindle motors for a hard disk drive require increased performance in terms of durability, reliability, noise reduction, power saving, rotation accuracy and so forth. To comply with these requirements, it is desirable to reduce the frictional losses in bearing devices used in spindle motors while also enhancing the load and impact resistances thereof.

SUMMARY OF THE INVENTION

In accordance with a first preferred embodiment of the present invention, a bearing device includes: a shaft arranged to extend along a central axis, the shaft including an outer circumferential surface and a convex portion having a curved surface provided at one end thereof; a substantially cylindrical sleeve including an inner circumferential surface opposed to the outer circumferential surface of the shaft; and a thrust plate including a concave portion having a curved surface arranged to make contact with the convex portion of the shaft, wherein the shaft is supported by the sleeve and the thrust plate so as to rotate about the central axis with respect to the sleeve and the thrust plate, and wherein the curvature radius (R1) of the concave portion is greater than the curvature radius (R2) of the convex portion (R1>R2) but equal to or smaller than about 2.0 times of the curvature radius (R2) of the convex portion.

In accordance with a second preferred embodiment of the present invention, a bearing device includes: a shaft arranged to extend along a central axis, the shaft including an outer circumferential surface and a convex portion having a curved surface provided at one end thereof; a substantially cylindrical sleeve including an inner circumferential surface opposed to the outer circumferential surface of the shaft; and a thrust plate including a concave portion having a curved surface arranged to make contact with the convex portion of the shaft, wherein the shaft is supported by the sleeve and the thrust plate so that it can rotate about the central axis with respect to the sleeve and the thrust plate, wherein the curvature radius (R1) of the concave portion is greater than the curvature radius (R2) of the convex portion (R1>R2), and wherein the entire surface of the convex portion of the shaft makes contact with the concave portion of the thrust plate such that the thrust plate flexibly receives the convex portion of the shaft.

With a bearing device in accordance with the first preferred embodiment of the present invention, the curvature radius (R1) of the concave portion of the thrust plate is greater than the curvature radius (R2) of the convex portion of the shaft (R1>R2). This makes it possible to reduce the contact area between the shaft and the thrust plate. Further, the curvature radius of the concave portion of the thrust plate preferably is equal to or smaller than about 2.0 times of the curvature radius of the convex portion of the shaft. This ensures that, when a load or impact acting toward the thrust plate is applied to the shaft, the entire surface of the concave portion can support the shaft before the concave portion undergoes plastic deformation. Therefore, it is possible to prevent deformation of the thrust plate.

With a bearing device in accordance with the second preferred embodiment of the present invention, the curvature radius (R1) of the concave portion of the thrust plate is greater than the curvature radius (R2) of the convex portion of the shaft (R1>R2). This makes it possible to reduce the contact area between the shaft and the thrust plate. Further, the entire surface of the convex portion of the shaft makes contact with the concave portion of the thrust plate such that the thrust plate flexibly receives the convex portion of the shaft. This ensures that, when a load or impact acting toward the thrust plate is applied to the shaft, the entire contact surface can bear the load or impact. Therefore, it is possible to prevent deformation of the thrust plate.

Other features, elements, steps, characteristics and advantages of the present invention will become more apparent from the following detailed description of preferred embodiments of the present invention with reference to the attached drawings.

DETAILED DESCRIPTION OF THE PREFERRED EMBODIMENTS

Hereinafter, preferred embodiments of the present invention will be described with reference to the accompanying drawings. In describing the shape and positional relationship of individual members, the direction extending along a central axis A will be referred to as a vertical direction, the side at which a rotor unit 4 lies will be called "upper" and the side at which a stator unit 3 lies will be called "lower". These definitions are merely for the sake of convenience in description and are not intended to limit the mounting postures of a bearing device with respect to the force of gravity, a spindle motor, and a disk drive apparatus when they are actually attached in place.

1. Configuration of Disk Drive Apparatus

Figure 1:
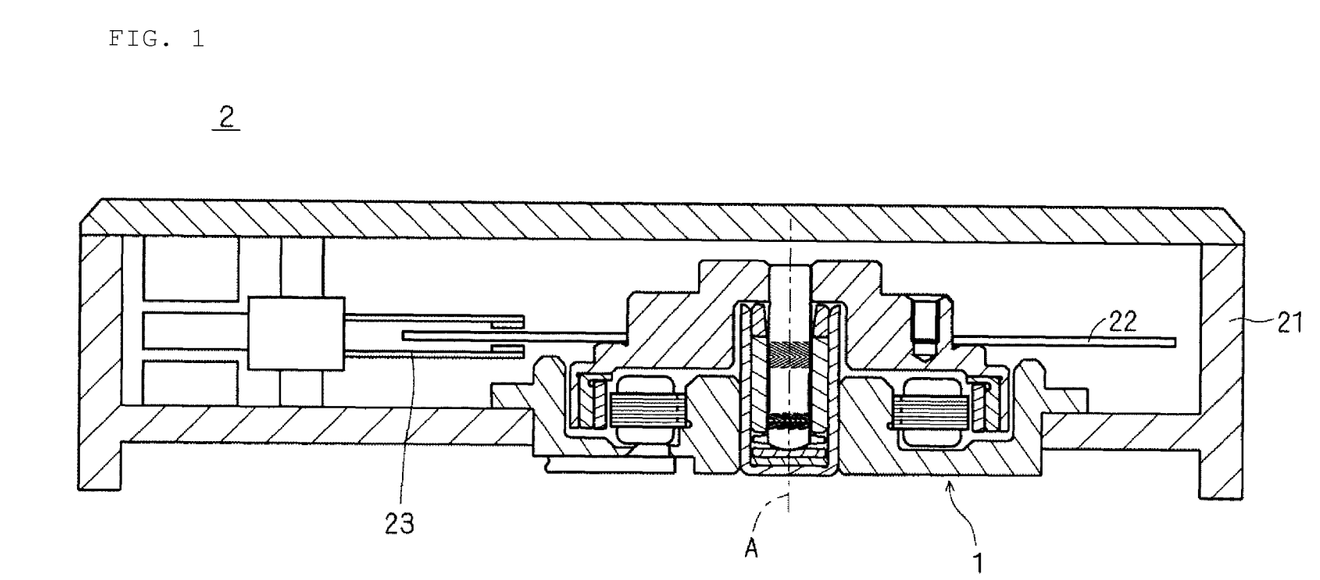
FIG. 1 is a vertical sectional view showing a disk drive apparatus.

FIG. 1 is a vertical sectional view of a disk drive apparatus 2 in accordance with a preferred embodiment of the present invention. Preferably, the disk drive apparatus 2 is a hard disk drive which preferably rotates a magnetic disk 22 and is preferably used to read information from the magnetic disk 22, and/or write information on the magnetic disk 22. As shown in FIG. 1, the disk drive apparatus 2 preferably includes an apparatus housing 21, the magnetic disk (hereinafter simply referred to as "disk") 22, an access unit 23 and a spindle motor 1. The disk 22, the access unit 23 and the spindle motor 1 are accommodated within the apparatus housing 21. The access unit 23 performs one or both of information reading and writing operations with respect to the disk 22 mounted on the spindle motor 1.

2. Configuration of Spindle Motor

Figure 2:
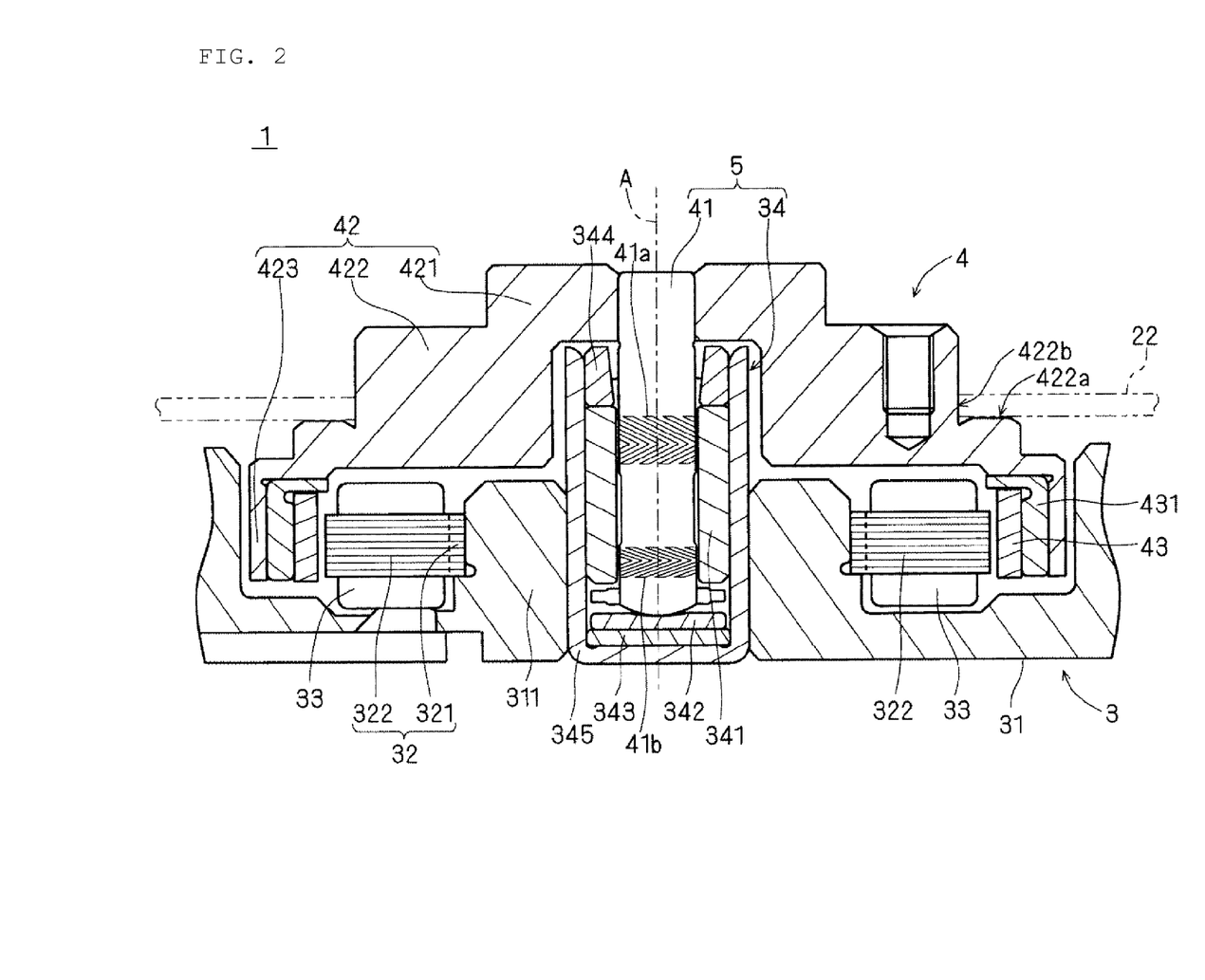
FIG. 2 is a vertical sectional view showing a spindle motor for the disk drive apparatus.

A description will now be made on the detailed configuration of the spindle motor 1. FIG. 2 is a vertical sectional view of the spindle motor 1. As shown in FIG. 2, the spindle motor 1 preferably includes a stator unit 3 fixed to the apparatus housing 21 of the disk drive apparatus 2 and a rotor unit 4 arranged to hold the disk 22 and rotate about a central axis A.

The configuration of the stator unit 3 will be described first. The stator unit 3 preferably includes a base member 31, a stator core 32, coils 33 and a stationary bearing unit 34.

The base member 31 is preferably made of, e.g., a metallic material such as an aluminum alloy or other suitable material, and is fixed to the apparatus housing 21 of the disk drive apparatus 2. However, the base 31 could be made of any other desirable material. The base member 31 preferably includes a substantially cylindrical holder portion 311 protruding axially (in the direction extending along the central axis A) around the central axis A. A through-hole into which to insert the stationary bearing unit 34 is provided radially (perpendicularly or substantially perpendicularly to the central axis A) inwards of the holder portion 311. The radial outer surface of the holder portion 311 serves as an installation surface to which the stator core 32 is fitted.

Although the base member 31 and the apparatus housing 21 are preferably independent of each other in the present preferred embodiment, they may also be a unitary member if so desired.

The stator core 32 and the coils 33 serve as a magnetic flux generating unit arranged to generate magnetic flux in response to the flow of a drive current. The stator core 32 preferably includes an annular core-back 321 fitted to the outer circumferential surface of the holder portion 311 of the base member 31 and a plurality of tooth portions 322 protruding radially outwards from the core-back 321. The stator core 32 is produced by, e.g., axially laminating punched electromagnetic steel plates one above another, or other suitable process.

The coils 33 are preferably defined by conductive wires wound on the respective tooth portions 322 of the stator core 32. The coils 33 are connected to a power supply device (not shown) through a connector. If the power supply device applies a drive current to the coils 33 through the connector, radially-flowing magnetic flux is generated in the tooth portions 322. The magnetic flux generated in the tooth portions 322 interacts with the magnetic flux of the rotor magnet 43, discussed below, thereby generating torque that rotates the rotor unit 4 about the central axis A.

The stationary bearing unit 34 is a mechanism arranged to rotatably support the shaft 41 of the rotor unit 4. The stationary bearing unit 34 and the shaft 41 serve to couple the stator unit 3 and the rotor unit 4 together so that they can rotate relative to each other about the central axis A.

Figure 3:
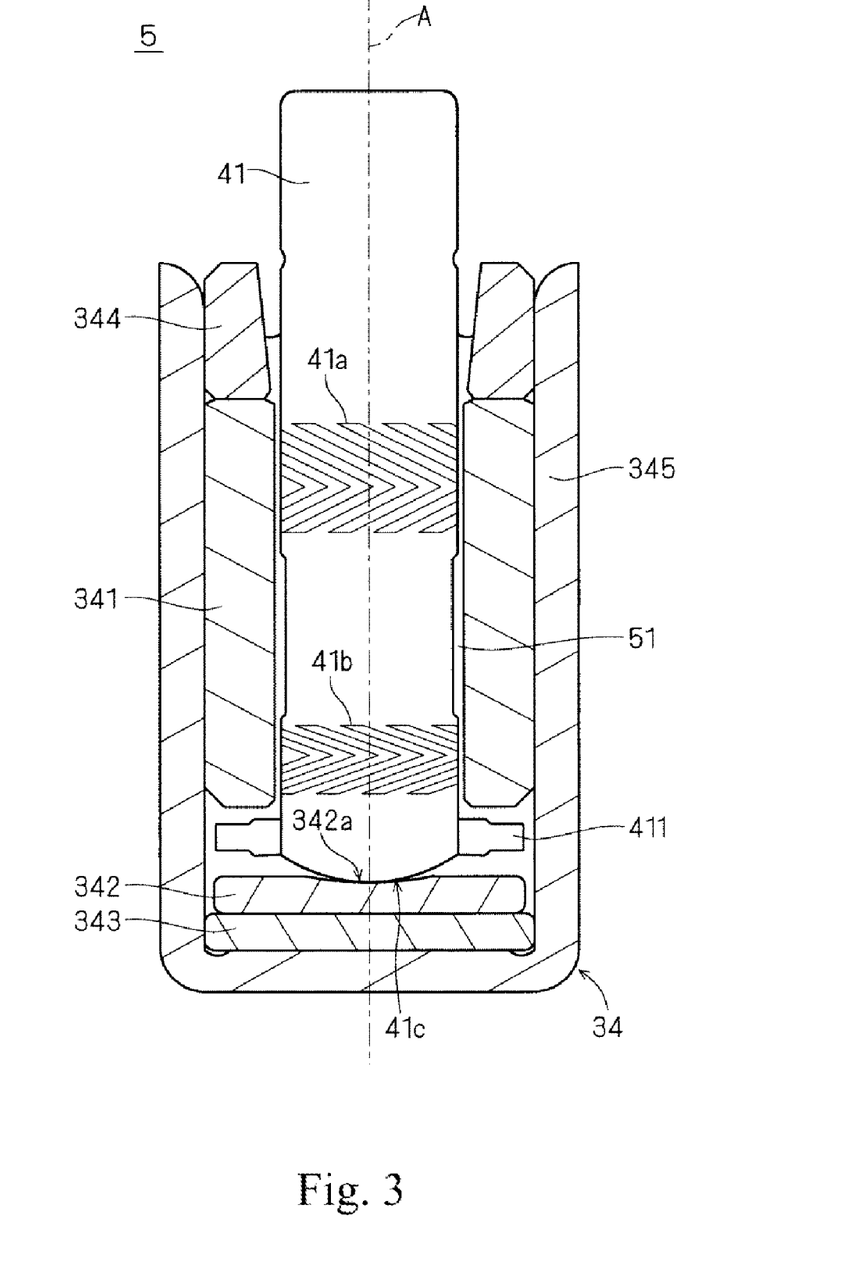
FIG. 3 is a vertical sectional view showing a fluid dynamic pressure bearing device used in the spindle motor.

FIG. 3 is an enlarged vertical sectional view showing a fluid dynamic pressure bearing device 5. As shown in FIG. 3, the stationary bearing unit 34 preferably includes a sleeve 341, a thrust plate 342, a magnet plate 343, a seal cap 344 and a bearing housing 345.

The sleeve 341 is preferably a substantially cylindrical member having an inner circumferential surface opposed to the outer circumferential surface of the shaft 41. The sleeve 341 is preferably adhesively fixed to the inner circumferential surface of the bearing housing 345, but another desirable fixing method could be used. The sleeve 341 functions as a radial bearing unit that supports the shaft 41 arranged radially inwards thereof, so as to permit rotation of the shaft 41 about the central axis A while restricting radial movement of the shaft 41. The inner circumferential surface of the sleeve 341 and the outer circumferential surface of the shaft 41 are opposed to each other with an extremely small gap (e.g., about several micrometers) left therebetween. Lubricating oil 51, described below, is preferably filled in the gap, but another fluid could be used if so desired.

The sleeve 341 is preferably made from a sintered body. The sintered body is produced by thermally bonding and solidifying metal powder. Therefore, the sintered body is a porous body with a number of pores when microscopically observed. Because of this, the surface of the sleeve 341 can be partially impregnated with the lubricating oil 51. Presence of the lubricating oil 51 allows the shaft 41 to smoothly rotate relative to the sleeve 341.

The thrust plate 342 is preferably a substantially disk-shaped member arranged below of the shaft 41. The thrust plate 342 has an upper surface making contact with the lower end portion of the shaft 41. Thus, the thrust plate 342 is arranged to function as a so-called pivot-type thrust bearing unit that axially supports the shaft 41 while permitting rotation of the shaft 41 about the central axis A.

A concave portion 342a of spherical surface shape is provided in the central area of the upper surface of the thrust plate 342. The curvature radius R1 of the concave portion 342a is preferably greater than the curvature radius R2 of a convex portion 41c provided in the lower end portion of the shaft 41 (see FIG. 4). This ensures that the convex portion 41c of the shaft 41 makes point-to-point or surface-to-surface contact with the concave portion 342a of the thrust plate 342. As a result of this feature, the shaft 41 can rotate relative to the thrust plate 342 with a very low rotational resistance. Another function of the concave portion 342a of the thrust plate 342 is to distribute the pressure of the shaft 41 applied to the thrust plate 342, consequently minimizing both a deformation of the thrust plate 342 and any wear of the upper surface of the thrust plate 342.

In the present preferred embodiment, the thrust plate 342 is preferably made of, e.g., a resin. This allows the thrust plate 342 to have higher elasticity than it would have were it made of other materials such as a metal or the like. It should be noted however, that any desirable material could be used to make the thrust plate 342. If a load or impact acting toward the thrust plate 342 is applied to the shaft 41, the concave portion 342a will flex to increase the contact area between the shaft 41 and the thrust plate 342. This helps distribute the pressure transferred from the shaft 41 to the thrust plate 342.

The thrust plate 342 may preferably be made of, e.g., a thermoplastic resin such as polyacetal or nylon. Other examples of the thermoplastic resin include polyamide-imide (PAI), polyether ether ketone (PEEK), thermoplastic polyimide (TPI), polytetrafluoroethylene (PTFE), polyphenylene sulfide (PPS), polybutylene terephthalate (PBT) and polyether imide (PEI). Two or more thermoplastic resins may be used in combination.

It is not always necessary to form the thrust plate 342 with only a thermoplastic resin. Alternatively, the thrust plate 342 may be made of the mixture of a thermoplastic resin and a thermosetting resin or may be added with filler that improves wear resistance. As the thermosetting resin, it may be possible to use, e.g., a phenol resin. As the filler, it may be possible to use, e.g., carbon fibers, carbon nano tubes, carbon powder, graphite, glass fibers, potassium titanate, or any other desirable material. The filler may preferably be mixed into the resin material in a quantity of, e.g., about 20% to about 40%, for example.

The magnet plate 343 is preferably a substantially disk-shaped member arranged between the thrust plate 342 and the bottom surface of the bearing housing 345. The upper surface of the magnet plate 343 is formed of a magnetic pole surface with a magnetic property. The magnet plate 343 attracts the shaft 41 toward the thrust plate 342 by generating a magnetic attracting force between itself and the shaft 41, which is preferably made of a magnetic material, such as steel, stainless steel, iron, etc. Thus, the magnet plate 343 is arranged to substantially stabilize the rotating posture of the rotor unit 4 including the shaft 41.

The seal cap 344 is preferably an annular member arranged above the sleeve 341. The inner circumferential surface of the seal cap 344 is defined by a slanted surface whose inner diameter becomes gradually greater as it moves axially upwards. Therefore, the boundary surface of the lubricating oil 51 between the inner circumferential surface of the seal cap 344 and the outer circumferential surface of the shaft 41 is arranged into a meniscus shape due to surface tension. This substantially prevents the lubricating oil 51 from leaking out of the stationary bearing unit 34. In other words, between the seal cap 344 and the shaft 41, there is provided a taper seal for the lubricating oil 51.

The seal cap 344 is preferably fixed to the inner circumferential surface of the bearing housing 345 by an adhesive agent with the lower surface thereof being brought into contact with the upper surface of the sleeve 341, but any other desirable attachment arrangement could be used. The seal cap 344 is preferably made of, e.g., a metal such as stainless steel or aluminum alloy or a resin. Although the seal cap 344 and the sleeve 341 are provided independently of each other in the present preferred embodiment, they may be a unitary member if so desired.

The bearing housing 345 is preferably a substantially cylindrical member with a closed bottom and a top opening. The bearing housing 345 is fixed to the inside of the holder portion 311 of the base member 31 by press fit, shrink fit, adhesive bonding, or any other desirable attachment method. The sleeve 341, the thrust plate 342, the magnet plate 343, and the seal cap 344 are accommodated within the bearing housing 345.

The bearing housing 345 is preferably produced by, e.g., press-forming a zinc-coated steel plate (SECE), namely a cold-rolled steel plate (SPCC, SPCD or SPCE) with a zinc-plated surface, into a substantially cylindrical shape with the bottom closed.

Lubricating oil 51 is filled in the bearing housing 345. The lubricating oil 51 is continuously filled between the inner circumferential surface of the sleeve 341 and the outer circumferential surface of the shaft 41, between the upper surface of the below-mentioned flange member 411 and the lower surface of the sleeve 341 and between the lower surface of the flange member 411 and the upper surface of the thrust plate 342. Examples of the lubricating oil 51 include ester-based oil such as polyol ester-based oil, diester-based oil and the like, or any other desirable oil type. The ester-based oil is superior in wear resistance, thermal stability and flowability, and is desirably used as the lubricating oil 51 of the fluid dynamic pressure bearing device 5.

Next, description will be given to the configuration of the rotor unit 4 of the spindle motor 1. The rotor unit 4 preferably includes the shaft 41, a hub 42 and the rotor magnet 43.

The shaft 41 is preferably a substantially cylindrical columnar member extending vertically along the central axis A. The shaft 41 is inserted into the sleeve 341 (or the bearing hole of the sleeve 341) and is supported by the sleeve 341 to be rotatable relative to the stationary bearing unit 34. In the present preferred embodiment, the shaft 41 is preferably made of stainless steel with a magnetic property and is attracted toward the thrust plate 342 by the magnetic force of the magnet plate 343.

Radial dynamic pressure groove arrays 41a and 41b are provided on the outer circumferential surface of the shaft 41. During rotation of the shaft 41, the radial dynamic pressure groove arrays 41a and 41b serve to generate a dynamic pressure in the lubricating oil 51 present between the outer circumferential surface of the shaft 41 and the inner circumferential surface of the sleeve 341. As shown in FIGS. 2 and 3, the radial dynamic pressure groove array 41a and the radial dynamic pressure groove array 41b are preferably arranged one above the other, each of which is defined by a so-called herringbone type groove array having a plurality of circumferentially-arranged chevron grooves. Upon rotation of the shaft 41, the lubricating oil 51 is pressurized by the radial dynamic pressure groove arrays 41a and 41b. The shaft 41 rotates in a state where it is radially supported by the dynamic pressure generated in the lubricating oil 51. The radial dynamic pressure groove array 41a may be provided on one of the outer circumferential surface of the shaft 41, the inner circumferential surface of the sleeve 341, or in any other desirable combination thereof.

A flange member 411 arranged to keep the shaft 41 from being removed from the stationary bearing unit 34 is fixed to the vicinity of the lower end portion of the shaft 41. The flange member 411 preferably protrudes radially outwards from the outer circumferential surface of the shaft 41. The upper surface of the flange member 411 is axially opposed to the lower surface of the sleeve 341.

When an upwardly-acting force is exerted on the shaft 41, the upper surface of the flange member 411 comes into contact with the lower surface of the sleeve 341. Otherwise, the upward force acting on the flange member 411 will be attenuated by the lubricating oil 51 present between the lower surface of the sleeve 341 and the upper surface of the flange member 411. This prevents the stationary bearing unit 34 and the shaft 41 from being separated from each other. The shaft 41 and the flange member 411 may be a unitary member if so desired.

The convex portion 41c preferably having a spherical surface shape is provided in the lower end portion of the shaft 41. The convex portion 41c of the shaft 41 makes contact with the concave portion 342a of the thrust plate 342, whereby the shaft 41 is axially supported. Description will be made later of the detailed configuration of the contact point between the shaft 41 and the thrust plate 342 and its neighborhood.

Referring back to FIG. 2, the hub 42 is a member fixed to the shaft 41 to rotate therewith. The hub 42 is preferably shaped to extend radially outwards around the central axis A. More specifically, the hub 42 preferably includes a joint portion 421 jointed to the upper end portion of the shaft 41 by, for example, press fit or shrink fit, a trunk portion 422 extending radially outwards and downwards from the joint portion 421 and a cylinder portion 423 suspending from the outer peripheral edge of the trunk portion 422. The hub 42 of this shape covers the upper portions of the stator core 32, the coils 33 and the stationary bearing unit 34.

A first support surface 422a and a second support surface 422b arranged to support the disk 22 are preferably provided in the trunk portion 422 of the hub 42. The first support surface 422a is a planar surface perpendicular or substantially perpendicular to the central axis A, while the second support surface 422b is a cylindrical surface arranged radially inwards of the first support surface 422a in parallel or substantially in parallel with the central axis A. When the disk 22 is mounted on the hub 42, the lower surface of the disk 22 makes contact with the first support surface 422a, and the inner circumference of the disk 22 comes into contact with the second support surface 422b. This restricts axial and radial movement of the disk 22.

The hub 42 is preferably made of, e.g., a metal plate such as an aluminum alloy plate, a magnetic stainless steel (SUS) plate, a cold-rolled steel plate (SPCC, SPCD or SPCE) or other suitable material.

The rotor magnet 43 is installed on the inner circumferential surface of the cylinder portion 423 of the hub 42 through a back yoke 431. The rotor magnet 43 preferably has an annular shape about the central axis A. The inner circumferential surface of the rotor magnet 43 is radially opposed to the outer circumferential surfaces of the tooth portions 322 of the stator core 32. The inner circumferential surface of the rotor magnet 43 is defined by a magnetic pole surface having N-poles and S-poles alternately arranged along the same.

With the spindle motor 1 described above, radial magnetic flux is generated in the tooth portions 322 of the stator core 32 when a drive current is applied to the coils 33 of the stator unit 3. Circumferentially-acting torque is generated by the magnetic flux flowing between the tooth portions 322 and the rotor magnet 43, thereby causing the rotor unit 4 to rotate about the central axis A with respect to the stator unit 3. The disk 22 mounted on the hub 42 rotates about the central axis A together with the shaft 41 and the hub 42.

3. Configuration of Contact Point Between Shaft and Thrust Plate and its Neighborhood Next, description will be given to the detailed configuration of the contact point between the shaft 41 and the thrust plate 342 and its neighborhood.

Figure 4:
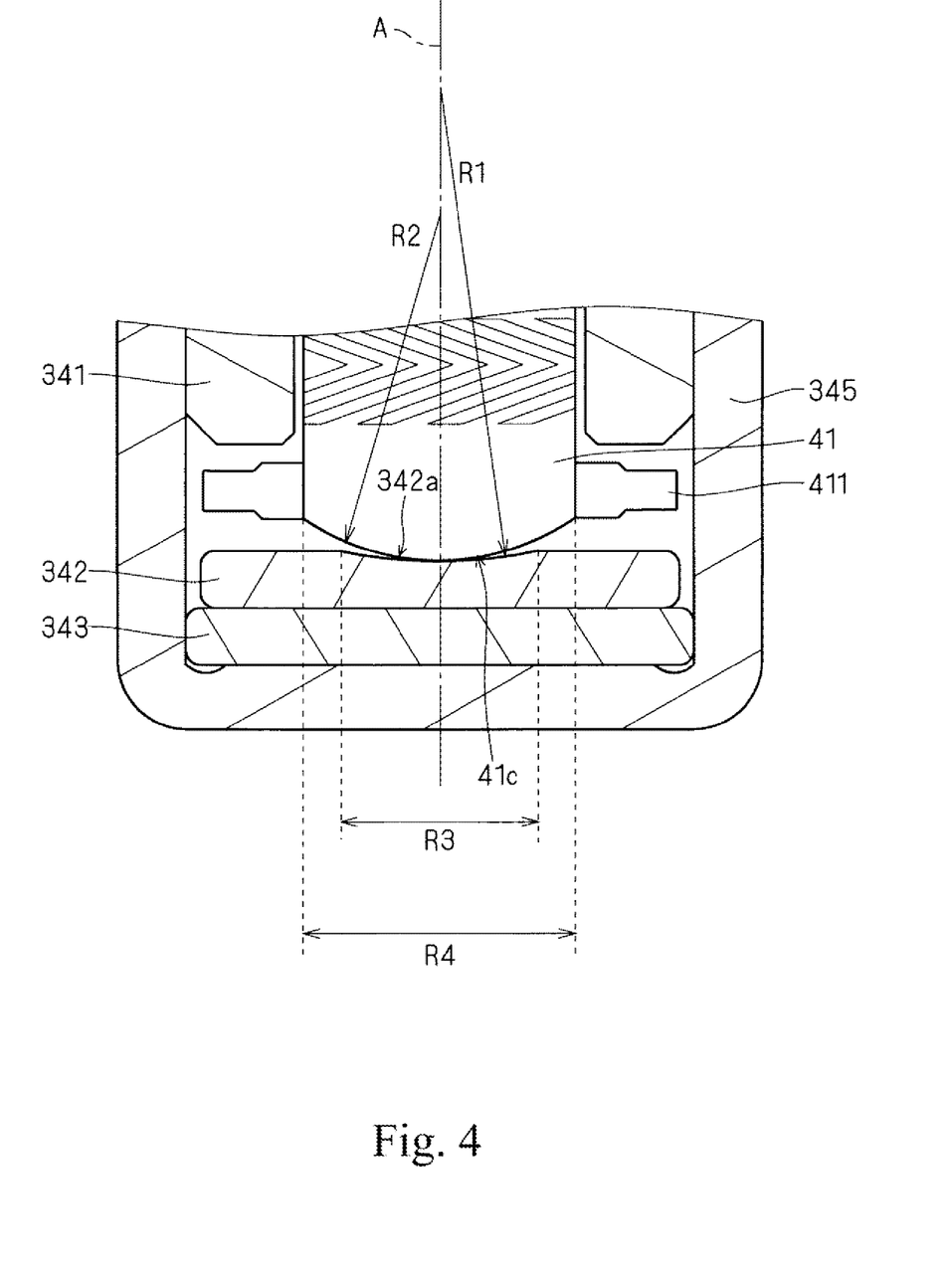
FIG. 4 is an enlarged vertical sectional view illustrating the contact point between a shaft and a thrust plate and its neighborhood.

FIG. 4 is an enlarged vertical sectional view illustrating the contact point between the shaft 41 and the thrust plate 342 and its neighborhood. As set forth earlier, the convex portion 41c provided in the lower end portion of the shaft 41 makes contact with the concave portion 342a provided on the upper surface of the thrust plate 342. Thus, the shaft 41 is supported on the thrust plate 342. The convex portion 41c of the shaft 41 has a spherical surface of a curvature radius R2. The concave portion 342a of the thrust plate 342 has a spherical surface of a curvature radius R1 greater than the curvature radius R2.

A hypothetical situation is considered where the ratio R1/R2 of the curvature radius R1 of the concave portion 342a to the curvature radius R2 of the convex portion 41c is unduly large. If a load or impact acting toward the thrust plate 342 is applied to the shaft 41, the load or impact concentrates on a portion of the concave portion 342a. This makes the thrust plate 342 susceptible to deformation. In order to prevent damage of the thrust plate 342, it is preferable to set the ratio R1/R2 equal to or smaller than an appropriate upper limit value. Description will now be made on how great of a value the ratio R1/R2 is to be set to.

Figure 5:
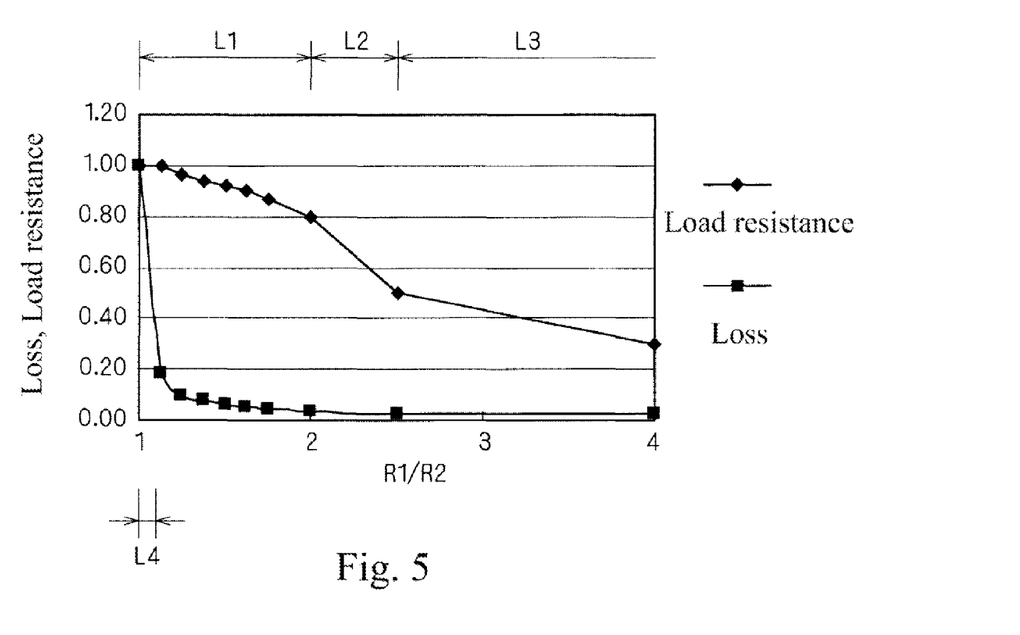
FIG. 5 is a graph representing the relationship between the curvature radius ratio of a concave portion and a convex portion, the tolerable load and the torque loss.

FIG. 5 is a graph plotting the results of measuring the tolerable load and the torque loss against the curvature radius ratio R1/R2 in the thrust plate 342 and the shaft 41 while changing the ratio R1/R2. The thrust plate 342 is preferably made of polyamide-imide (PAI), and the shaft 41 is preferably made of martensite-based stainless steel (SUS420J2), for example.

In this regard, the term "tolerable load" refers to the maximum downward load that can be applied to the shaft 41 without causing plastic deformation in the concave portion 342a of the thrust plate 342. The term "torque loss" denotes the loss of torque during rotation caused by the friction between the concave portion 342a and the convex portion 41c. The horizontal axis in FIG. 5 indicates the ratio R1/R2 of the curvature radius R1 to the curvature radius R2. The vertical axis in FIG. 5 indicates the relative values of the tolerable load and the torque loss under the assumption that the tolerable load and the torque loss are equal to about 1 when the ratio R1/R2 is equal to about 1.0, for example.

The data (or plots) in FIG. 5 are the ones available when the ratio R1/R2 is set approximately equal to 1.0 (R1=8 mm and R2=8 mm), 1.125 (R1=9 mm and R2=8 mm), 1.25 (R1=10 mm and R2=8 mm), 1.375 (R1=11 mm and R2=8 mm), 1.5 (R1=12 mm and R2=8 mm), 1.625 (R1=13 mm and R2=8 mm), 1.75 (R1=14 mm and R2=8 mm), about 2.0 (R1=16 mm and R2=8 mm), 2.5 (R1=20 mm and R2=8 mm) and 4.0 (R1=32 mm and R2=8 mm).

Considering the change in tolerable load shown in FIG. 5, the rate of change (or the descending width) of the tolerable load remains relatively small in the range L1 (1.0≦R1/

R2≦about 2.0) but becomes relatively great in the range L2 (about 2.0<R1/R2≦2.5). In the range L3 (2.5<R1/R2), it is predicted that the rate of change of the tolerable load gets gradually closer to zero as the ratio R1/R2 increases.

The reason for such a difference being generated in the rate of change of the tolerable load is as follows.

Figure 6:
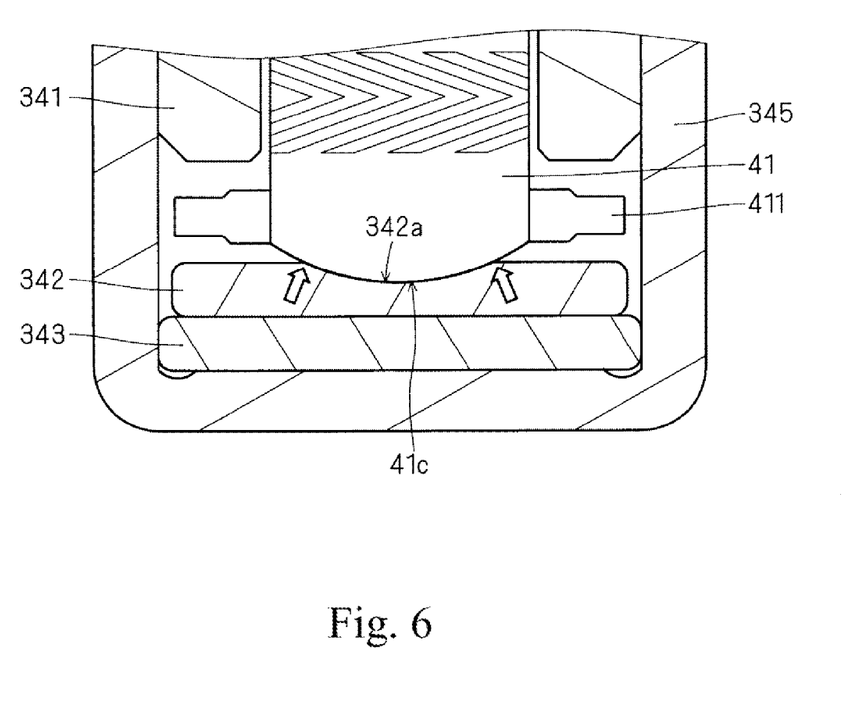
FIG. 6 is an enlarged vertical sectional view illustrating the contact point between a shaft and a thrust plate and its neighborhood when a downwardly acting load is applied to the shaft.

In the range L1, the concave portion 342a of the thrust plate 342 undergoes elastic deformation if a downward load is applied to the shaft 41. As a result, the entire surface of the concave portion 342a of the thrust plate 342 comes into contact with the convex portion 41c of the shaft 41 as illustrated in FIG. 6. In other words, the shaft 41 is supported by the entire surface of the concave portion 342a before the thrust plate 342 undergoes plastic deformation. In the range L1, even if the ratio R1/R2 is changed slightly, the entire surface of the concave portion 342a of the thrust plate 342 is kept in contact with the convex portion 41c of the shaft 41 by the load applied to the shaft 41. Since little change occurs in the contact area between the concave portion 342a and the convex portion 41c, the rate of change of the tolerable load remains small in the range L1.

Figure 7:
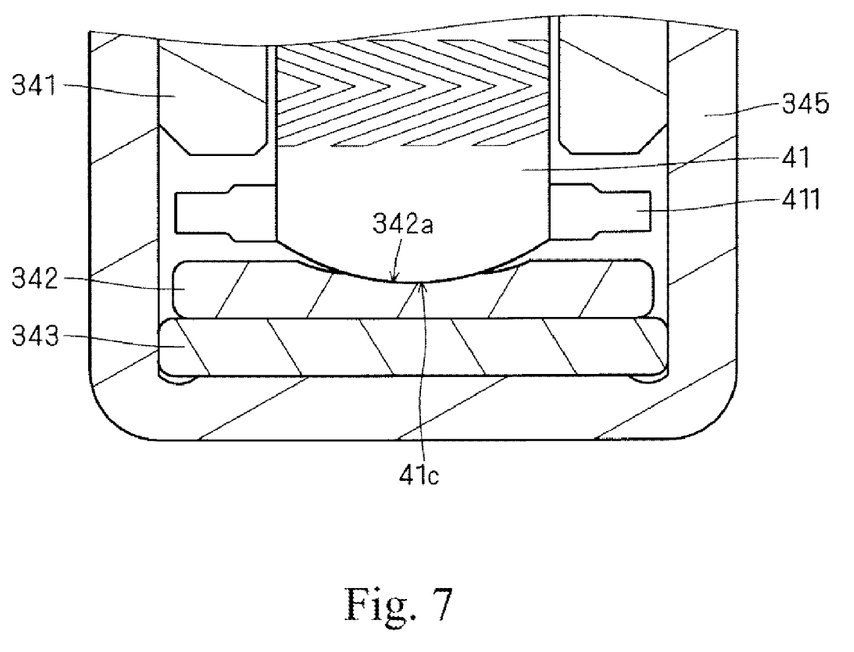
FIG. 7 is an enlarged vertical sectional view illustrating the contact point between a shaft and a thrust plate and its neighborhood when a downwardly acting load is applied to the shaft.

In the range L2, the concave portion 342a of the thrust plate 342 undergoes elastic deformation if a downward load is applied to the shaft 41. As illustrated in FIG. 7, the concave portion 342a of the thrust plate 342 partially makes contact with the convex portion 41c of the shaft 41. In the range L2, however, the concave portion 342a of the thrust plate 342 is deformed before the entire surface of the concave portion 342a comes into contact with the convex portion 41c. In the range L2, the maximum contact area between the concave portion 342a and the convex portion 41c in a loaded state varies with the change of the ratio R1/R2. This is why the rate of change of the tolerable load becomes large in the range L2.

Figure 8:
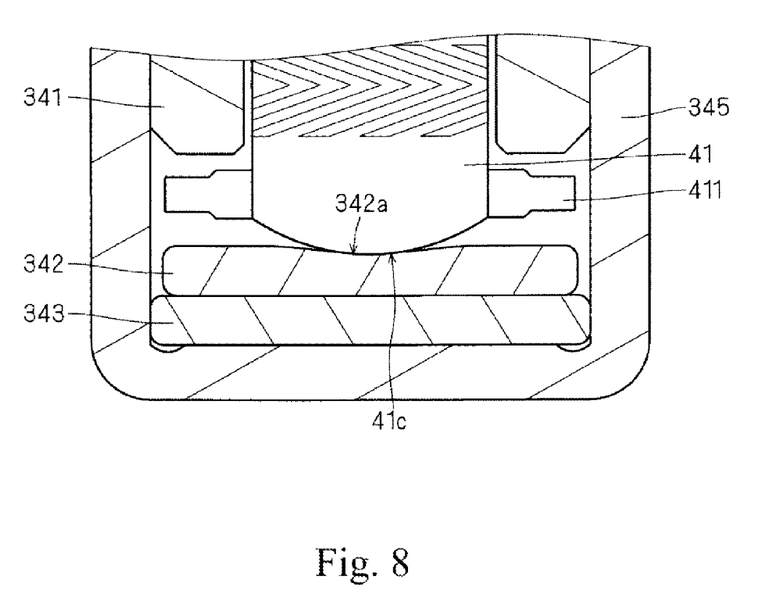
FIG. 8 is an enlarged vertical sectional view illustrating the contact point between a shaft and a thrust plate and its neighborhood when a downwardly acting load is applied to the shaft.

In the range L3, the concave portion 342a becomes substantially planar with respect to the convex portion 41c as the ratio R1/R2 increases. In the range L3, therefore, the contact area between the concave portion 342a and the convex portion 41c when a downward load is applied to the shaft 41 becomes quite narrow as illustrated in FIG. 8. In the range L3, little change occurs in the contact area between the concave portion 342a and the convex portion 41c, even if the ratio R1/R2 is changed. This is why the rate of change of the tolerable load comes gradually closer to zero in the range L3.

Although the graph shown in FIG. 5 represents the results available when the thrust plate 342 is preferably made of polyamide-imide (PAI) with the shaft 41 made of stainless steel (SUS420J2) which has a sufficiently greater bending elastic modulus than that of the PAI, it is presumed that use of other materials similar in elastic modulus will also provide substantially the same results.

In the present preferred embodiment, the curvature radius R1 of the concave portion 342a and the curvature radius R2 of the convex portion 41c are set based on these results such that the ratio R1/R2 preferably becomes equal to or smaller than about 2.0. That is to say, the curvature radius R1 of the concave portion 342a is preferably set equal to or smaller than about 2.0 times of the curvature radius R2 of the convex portion 41c. This ensures that, when a load or impact acting toward the thrust plate 342 is applied to the shaft 41, the entire surface of the concave portion 342a can support the shaft 41 before the concave portion 342a undergoes plastic deformation. Therefore, it is possible to prevent deformation of the thrust plate 342.

In the present preferred embodiment, the diameter R3 of the rim of the concave portion 342a is smaller than the diameter R4 of the rim of the convex portion 41c as can be seen in FIG. 4. This ensures that the rim of the concave portion 342a makes contact with the convex portion 41c of the shaft 41 when a load or impact acting toward the thrust plate 342 is applied to the shaft 41. In other words, it is possible for the rim of the concave portion 342a to reliably support the shaft 41 as indicated by white arrows in FIG. 6.

The diameter R3 of the rim of the concave portion 342a may be preferably about 1.0 mm to about 2.5 mm and more preferably about 1.5 mm to about 2.0 mm, for example. The diameter R4 of the rim of the convex portion 41c may be preferably about 2.5 mm to about 5.0 mm, more preferably about 3.5 mm to about 4.5 mm and even more preferably about 3.9 mm to about 4.1 mm, for example.

Considering the change in torque loss shown in FIG. 5, the value of torque loss is sharply decreased in the range L4 (1.0<R1/R2<1.1). This is because when no downward external force acts on the shaft 41, the contact area between the concave portion 342a and the convex portion 41c is sharply reduced in the range L4. If the ratio R1/R2 becomes equal to or greater than about 1.1, the torque loss is kept low. Then, the torque loss is gradually decreased along with the increase of the ratio R1/R2. By setting the curvature radii R1 and R2 so that the ratio R1/R2 becomes equal to or greater than about 1.1, it is possible to reduce the torque loss during rotation and to assure smooth rotation of the shaft 41.

Figure 9:
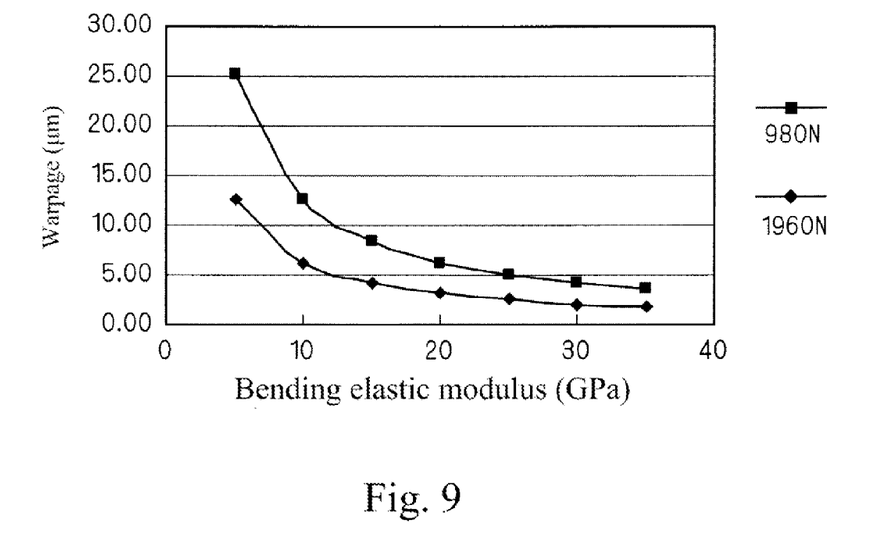
FIG. 9 is a graph representing the amount of warpage caused by elastic deformation when downwardly acting loads are applied to a plurality of plates with different bending elastic moduli.

FIG. 9 is a graph representing the amount of warpage caused by elastic deformation when downwardly acting loads are applied to a plurality of plates with different bending elastic moduli. The horizontal axis in FIG. 9 indicates the bending elastic moduli (GPa) of the plates, while the vertical axis in FIG. 9 indicates the amount of warpage (μm) generated in the plates. The plates have a thickness substantially equal to the thickness of the thrust plate 342. The loads applied to the plates are about 980 N (100 kgf) and about 1960 N (200 kgf), for example.

As can be seen in FIG. 9, the amount of warpage of the thrust plate 342 when a downward load is applied to the upper surface of the thrust plate 342 becomes greater as the bending elastic modulus of the thrust plate 342 gets smaller. The amount of warpage becomes smaller as the bending elastic modulus of the thrust plate 342 gets greater. If the bending elastic modulus of the thrust plate 342 is too small, the axial vibration amplitude of the shaft 41 may be increased, thereby making it difficult for the head of the access unit 23 to perform reading and writing operations with respect to the disk 22. In contrast, if the bending elastic modulus of the thrust plate 342 is too great, it is impossible to effectively distribute the load or impact acting on the concave portion 342a, making the thrust plate 342 susceptible to damage. Therefore, it is desirable to appropriately set the bending elastic modulus of the thrust plate 342 so as to prevent deformation of the thrust plate 342 while reducing the axial vibration amplitude of the shaft 41.

More specifically, the bending elastic modulus of the thrust plate 342 is preferably in a range of from about 8 GPa to about 30 GPa and more preferably in a range of from about 10 GPa to about 27 GPa, for example. In an instance where the thrust plate 342 is made of polyether imide (PEI), polyphenylene sulfide (PPS) and polyamide-imide (PAI), the bending elastic moduli of the thrust plate 342 may preferably be about 13 GPa, about 25 GPa and about 27 GPa, respectively, for example.

Figure 10:
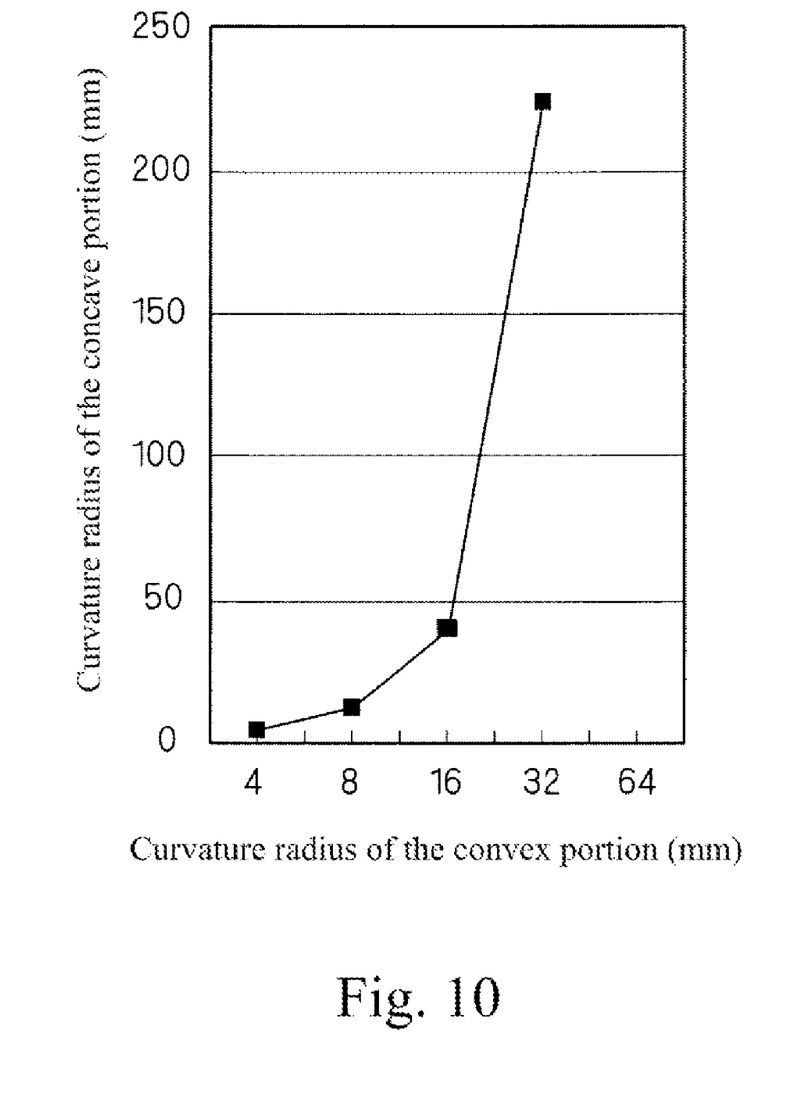
FIG. 10 is a graph representing the measurement results of curvature radii of the worn-out concave portions provided on a planar resin surface when a plurality of shafts with convex portions differing in curvature radius is brought into contact with the resin surface and rotated for a long enough time.

FIG. 10 is a graph representing the measurement results of curvature radii of the worn-out concave portions formed on a resin surface. The wearing tasks are performed by bringing a plurality of shafts with convex portions differing in curvature radius into contact with a planar resin surface made of polyamide-imide (PAI) and then rotating the shafts for a long enough time until the wear of the resin surface is hardly in progress. The horizontal axis in FIG. 10 indicates the curvature radii R2 (mm) of the convex portions of the shafts. The vertical axis in FIG. 10 indicates the curvature radii R1 (mm) of the concave portions defined on the resin surface.

As can be seen in FIG. 10, when the curvature radius R2 is equal to about 4 mm, the wear of the resin surface hardly occurs if the curvature radius of the concave portion formed on the resin surface reaches about 5 mm. In case where the curvature radius R2 is equal to about 8 mm, the wear of the resin surface hardly occurs if the curvature radius of the concave portion formed on the resin surface reaches about 12.8 mm. When the curvature radius R2 is equal to about 16 mm, the wear of the resin surface hardly occurs if the curvature radius of the concave portion formed on the resin surface reaches about 40 mm.

If these results are expressed in terms of the contact between the shaft 41 and the thrust plate 342, the following presumption holds true. The meaningful wear of the resin surface is no longer in progress if R1/R2≦1.2 (=5 mm/4 mm) when R2=4 mm. The meaningful wear of the resin surface is no longer in progress if R1/R2≦1.6 (=12.8 mm/8 mm) when R2=8 mm. The meaningful wear of the resin surface is no longer in progress if R1/R2≦2.5 (=40 mm/16 mm) when R2=16 mm. In view of these results, it is presumed that the meaningful wear of the resin surface is no longer in progress if R1/R2≦about 2.0 when R2=about 10 mm, for example.

Considering such results, the condition of R2≧about 10 mm as well as the condition of R1/R2≦about 2.0 may be added in setting the curvature radii R1 and R2. If the curvature radii R1 and R2 are set to comply with the condition of R1/R2≦about 2.0 and the condition of R2≧about 10 mm, it is possible to make the concave portion 342a of the thrust plate 342 extremely hard to wear. For the standpoint of workability of the convex portion 41c of the shaft 41, it is preferred that the curvature radius R2 is set equal to or smaller than about 20 mm, for example.

4. Modified Examples

While preferred embodiments of the present invention have been described hereinabove, the present invention shall not be limited thereto.

In the foregoing preferred embodiments, the concave portion 342a of the thrust plate 342 and the convex portion 41c of the shaft 41 all preferably have a spherical surface shape, for example. However, the present invention is not limited thereto. The concave portion 342a and the convex portion 41c may have a curved surface other than the spherical surface shape. In other words, the concave portion 342a and the convex portion 41c may not have uniform curvature radii over the entire surfaces thereof. It will be sufficient if the curvature radii R1 and R2 of at least the mutually-contacting portions of the surfaces of the concave portion 342a and the convex portion 41c comply with the numerical conditions mentioned above. However, it is preferable for the concave portion 342a and the convex portion 41c to have uniform curvature radii over the entire surfaces thereof. This is because the contact area between the concave portion 342a and the convex portion 41c can be effectively changed depending on the magnitude of the load or impact applied to the shaft 41.

Although the diameter R3 of the rim of the concave portion 342a is preferably smaller than the diameter R4 of the rim of the convex portion 41c in the foregoing preferred embodiments, the diameter R3 may be equal to or greater than diameter R4. In such instances, the entire surface of the convex portion 41c of the shaft 41 will make contact with the concave portion 342a of the thrust plate 342 if a load acting toward the thrust plate 342 is applied to the shaft 41.

In the foregoing preferred embodiments, the magnet plate 343 is preferably arranged within the bearing housing 345 so that the shaft 41 can be pulled downwards by the magnetic force of the magnet plate 343. However, the bearing device of the present invention may not necessarily include the magnet plate 343.

Although the foregoing preferred embodiments are preferably directed to the spindle motor 1 arranged to rotate the magnetic disk 22 and the fluid dynamic pressure bearing device 5 used in the spindle motor 1, the present invention is not limited thereto. Alternatively, the present invention may be applied to a spindle motor arranged to rotate other kinds of disks such as an optical disk and the like and a bearing device used therein. However, it is of great technical significance to apply the present invention to the spindle motor arranged to rotate a magnetic disk, because such a spindle motor requires exceptionally low frictional loss and extraordinarily high load resistance and impact resistance.

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:

1. A bearing device comprising:
    a shaft arranged to extend along a central axis, the shaft including a convex portion having a curved surface provided at a first axial end thereof;
    a substantially cylindrical sleeve including an inner circumferential surface opposed to an outer circumferential surface of the shaft; and
    a thrust plate including a concave portion having a curved surface and arranged to make contact with the convex portion of the shaft; wherein
    the shaft is supported by the sleeve and the thrust plate such that the shaft can rotate about the central axis with respect to the sleeve and the thrust plate; and
    a curvature radius of the concave portion is greater than a curvature radius of the convex portion but equal to or smaller than about 2.0 times of the curvature radius of the convex portion.

2. The bearing device of claim 1, wherein the curvature radius of the concave portion is equal to or greater than about 1.1 times of the curvature radius of the convex portion.

3. The bearing device of claim 1, wherein the curvature radius of the convex portion is equal to or greater than about 10 mm.

4. The bearing device of claim 1, wherein the concave portion includes a rim whose diameter is smaller than the diameter of a rim of the convex portion.

5. The bearing device of claim 1, wherein the thrust plate is made of a resin.

6. The bearing device of claim 1, wherein the thrust plate is made of a material having a bending elastic modulus from about 8 GPa to about 30 GPa.

7. The bearing device of claim 1, wherein the convex portion has a convex spherical surface and the concave portion has a concave spherical surface.

8. A bearing device comprising:
    a shaft arranged to extend along a central axis, the shaft including a convex portion having a curved surface provided at a first axial end thereof;

a substantially cylindrical sleeve including an inner circumferential surface opposed to an outer circumferential surface of the shaft; and a thrust plate including a concave portion having a curved surface and arranged to make contact with the convex portion of the shaft; wherein the shaft is supported by the sleeve and the thrust plate such that the shaft can rotate about the central axis with respect to the sleeve and the thrust plate;

a curvature radius of the concave portion is greater than a curvature radius of the convex portion; and an entire surface of the convex portion of the shaft makes contact with the concave portion of the thrust plate such that the thrust plate flexibly receives the convex portion of the shaft.

9. The bearing device of claim 8, wherein the concave portion includes a rim having a diameter that is smaller than a diameter of a rim of the convex portion.

10. The bearing device of claim 8, wherein the thrust plate is made of a resin.

11. The bearing device of claim 8, wherein the thrust plate is made of a material having a bending elastic modulus from about 8 GPa to about 30 GPa.

12. The bearing device of claim 8, wherein the convex portion has a convex spherical surface shape and the concave portion has a concave spherical surface shape.

13. A spindle motor comprising:

a stator unit;

a rotor unit including a mounting portion arranged to mount a disk thereon, the rotor unit being supported on the stator unit through the bearing device of claim 1 such that the rotor unit rotates with respect to the stator unit; and a torque generating unit arranged to generate torque about the central axis between the stator unit and the rotor unit.

14. The spindle motor of claim 13, wherein the disk includes a magnetic disk.

15. A disk drive apparatus comprising:

the spindle motor of claim 13;

an access unit arranged to perform one or both of an information reading task and an information writing task with respect to the disk mounted on the rotor unit of the spindle motor; and a housing arranged to accommodate the spindle motor and the access unit.

16. A spindle motor comprising:

a stator unit;

a rotor unit including a mounting portion arranged to mount a disk thereon, the rotor unit being supported on the stator unit through the bearing device of claim 8 such that the rotor unit rotates with respect to the stator unit; and a torque generating unit arranged to generate torque about the central axis between the stator unit and the rotor unit.

17. The spindle motor of claim 16, wherein the disk includes a magnetic disk.

18. A disk drive apparatus comprising:

the spindle motor of claim 16;

an access unit arranged to perform one or both of an information reading task and an information writing task with respect to the disk mounted on the rotor unit of the spindle motor; and a housing arranged to accommodate the spindle motor and the access unit.

* * * * *